United States Patent
Chen et al.

(10) Patent No.: US 11,113,505 B2
(45) Date of Patent: *Sep. 7, 2021

(54) PALM PRINT IMAGE MATCHING TECHNIQUES

(71) Applicant: MorphoTrak, LLC, Anaheim, CA (US)

(72) Inventors: Hui Chen, Foothill Ranch, CA (US); Peter Zhen-Ping Lo, Mission Viejo, CA (US)

(73) Assignee: MorphoTrak, LLC, Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,473

(22) Filed: Nov. 8, 2019

(65) Prior Publication Data

US 2020/0193116 A1  Jun. 18, 2020

Related U.S. Application Data

(63) Continuation of application No. 16/222,143, filed on Dec. 17, 2018, now abandoned, which is a
(Continued)

(51) Int. Cl.
*G06K 9/00* (2006.01)
*G06K 9/52* (2006.01)
(Continued)

(52) U.S. Cl.
CPC .......... *G06K 9/001* (2013.01); *G06K 9/0008* (2013.01); *G06K 9/00067* (2013.01); *G06K 9/52* (2013.01);
(Continued)

(58) Field of Classification Search
None
See application file for complete search history.

(56) References Cited

U.S. PATENT DOCUMENTS

| 2002/0061125 | A1 | 5/2002 | Fujii |
| 2008/0273769 | A1 | 11/2008 | Lo et al. |

(Continued)

OTHER PUBLICATIONS

Candela et al., "PCASYS: A Pattern-Level Classification Automation System for Fingerprints", NIST Technical Report, NISTIR 5647, Aug. 1995, 41 pages.
(Continued)

*Primary Examiner* — Kim Y Vu
*Assistant Examiner* — Nathan J Bloom
(74) *Attorney, Agent, or Firm* — Fish & Richardson P.C.

(57) ABSTRACT

In some implementations, a method may be used for matching palm print images. A search template that identifies at least a plurality of distinctive search orientation blocks within a search orientation field may be initially generated for a search palm print image. A reference template may be obtained. A mated distinctive reference orientation block may be identified for each of the distinctive search orientation blocks. One or more regions of the search orientation field that include the distinctive search orientation blocks may be compared against one or more corresponding regions of the reference orientation field. An orientation similarity score between the search palm print image and the reference palm print image may be computed based on the comparison. A match may finally be determined if the computed orientation score satisfies a predetermined threshold value.

17 Claims, 8 Drawing Sheets

Related U.S. Application Data continuation of application No. 15/260,853, filed on Sep. 9, 2016, now Pat. No. 10,192,098.

(51) Int. Cl.
    *G06T 7/40*     (2017.01)
    *G06T 7/73*     (2017.01)

(52) U.S. Cl.
    CPC ................ *G06T 7/40* (2013.01); *G06T 7/74* (2017.01); *G06T 2207/20021* (2013.01); *G06T 2207/30196* (2013.01)

(56) References Cited

U.S. PATENT DOCUMENTS

| | | |
|---|---|---|
| 2009/0169072 A1 | 7/2009 | Lo |
| 2010/0135540 A1 | 6/2010 | Cervantes |
| 2016/0275330 A1 | 9/2016 | Zhou |
| 2017/0140192 A1 | 5/2017 | Lo et al. |
| 2017/0344794 A1 | 11/2017 | Chen |

OTHER PUBLICATIONS

D. Zhang and W. Shu, "Two Novel Characteristics in Palmprint Verification: Datum Point Invariance and Line Feature Matching," Pattern Recognition, vol. 32, No. 4, pp. 691-702, 1999.

Duta et al., "Matching of Palmprint", Pattern Recognition Letters, vol. 23, No. 4, pp. 477-485, 2002.

Ito et al., "A Palmprint Recognition Algorithm Using Phase-Based Image Matching," IEEE, ICIP, 2006. pp. 2669-2672.

L. Zhang and D. Zhang, "Characterization of Palmprints by Wavelet Signatures via Orientation Context Modeling", IEEE Trans. on SMC-B, vol. 34, No. 3, pp. 1335-1347, Jun. 2004.

Li et al., "Palmprint Identification by Fourier Transform," International Journal of Pattern Recognition and Artificial Intelligence, vol. 16, No. 4, pp. 417-432, 2002.

Liu et al., "Fingerprint registration by maximization of mutual information", IEEE Transactions on Image Processing, vol. 15, No. 5, pp. 1100-1110, 2006.

Lu et al., "Palmprint Recognition Using Eigenpalms Features", Pattern Recognition Letters, vol. 24, issues 9-10, pp. 1463-1467, 2003.

You et al., "On Hierarchical Palmprint Coding with Multi-features for Personal Identification in Large Databases", IEEE Transactions on Circuit Systems for Video Technology, vol. 14, No. 2, pp. 234-243, 2004.

PALM PRINT IMAGE MATCHING TECHNIQUES

CROSS-REFERENCE TO RELATED APPLICATION

This application is a continuation application of, U.S. application Ser. No. 16/222,143, filed on Dec. 17, 2018, which is a continuation of U.S. application Ser. No. 15/260,853, filed on Sep. 9, 2016, now U.S. Pat. No. 10,192,098, issued on Jan. 29, 2019.

FIELD

The present specification relates generally to biometric recognition/identification systems.

BACKGROUND

Automatic biometric identification systems are commonly used in many contexts to efficiently identify and verify the identity of individuals. For instance, automatic fingerprint identification systems often make such identification or verification based on distinctive characteristics of fingerprints present on a target's finger. In such systems, the distinctive and invariant characteristics are extracted from an image that includes classification type, core and delta, minutia points and compared to those of a set of previously collected reference images.

SUMMARY

Traditional fingerprint identification techniques such as minutiae matching are often unable to be efficiently used with palm print images. For example, because the size of a palm print is much larger than a fingerprint, a palm print includes many more pixels and a larger number of minutiae than those of a fingerprint. Techniques used for fingerprints are often too slow to be effectively used in real-world palm print identification applications. In addition, in palm print identification operations where one search palm print is compared against multiple reference palm prints, the computational resources necessary to perform all of the comparisons are often too high for typical fingerprint identification systems.

Accordingly, one innovative aspect described throughout this specification includes systems and techniques capable of increasing the speed and accuracy of matching two palm print images. The palm print matching techniques include a two-step process that involving an orientation image matching procedure to quickly align two palm print images, followed by minutiae matching procedure to determine whether geometric features between the two palm prints correspond to determine a successful match.

The orientation matching procedure refers to the process of identifying regions of a search orientation field that have similar ridge flow directions to regions of a corresponding reference orientation field. This procedure can be used to identify regions of a reference palm print with a similar orientation to that of the search palm print. In addition, techniques are described to iteratively perform the orientation matching procedure from a coarse-to-fine level (e.g., from low resolution to high resolution) in order to increase the overall speed of the palm print matching techniques while also obtaining a sufficiently accurate result by reducing the number of comparisons that are necessary to obtain the sufficiently accurate match result.

As an example, at each individual stage, a list of mated block pairs are initially identified between a search orientation field and a reference orientation field using techniques described below. Only the top-ranked mated block pairs are then selected and subsequently compared in the next matching stage at a finer level (e.g., higher resolution orientation fields). In this regard, at each successive stage, the search orientation field and the reference orientation field are compared at higher resolutions, but with a smaller number of mated block pairs identified in the previous matching stage. Thus, the most resource-intensive comparisons (e.g., finer level comparisons) are only performed on the mated block pairs that are most likely to represent matching segments of a search palm print image and a reference palm print image. This reduces the number of overall comparisons required to achieve a sufficiently accurate match result between the search palm print image and the reference palm print image.

During the orientation matching procedure, the system initially computes respective orientation similarity scores between a search palm print template and a set of pre-generated reference palm print templates. The respective orientation similarity scores are used to distinguish between reference palm prints that are likely to be mated with the search palm print (e.g., reference palm print templates with a computed orientation satisfying a predetermined threshold), and other reference palm prints that are likely to be different from the search palm print. The system then computes transformation parameters for the mated reference templates based on an alignment procedure. The transformation parameters indicate geometric adjustments to the search palm print template to maximize the number of corresponding minutiae between the transformed search palm print and a mated reference palm print template. By doing so, the time to perform for minutia matching in the second step is reduced.

During the minutiae matching procedure, the computed transformation parameters are used to generate a set of transformed search palm print templates that are aligned to each of the reference palm print templates identified in the orientation matching procedure. The system then identifies a set of mated minutiae within each transformed search palm print image and its corresponding reference palm print image. Geometric features associated with each of the mated minutiae are then compared in order to compute a match score that reflects a similarity between the search palm print image and the corresponding reference palm print image. The reference palm print images with the greatest similarity scores are then identified as potential match candidates for the search palm print image.

The techniques described above can be used to increase the matching speed and accuracy associated with a palm print matching operation. For example, during the orientation matching operation, because only a subset of reference templates that have an orientation similarity score that satisfy a threshold are selected and processed, the computational resources associated with processing all reference palm print templates (including non-mated reference templates) is reduced. In addition, during the minutiae matching operation, only local minutiae identified within an overlapping region of the transformed search palm print image and a corresponding reference palm print image are compared, further reducing the number of minutiae comparisons required to generate an accurate match determination.

Implementations may include one or more of the following features. For example, a method for matching palm print images may be implemented by an automatic palm print identification system. The system may include a processor, a memory coupled to the processor, an interface to a palm print scanning device, and a sensor associated with the palm print scanning device. The method may include: generating, for a search palm print image, a search template that identifies at least a plurality of distinctive search orientation blocks within a search orientation field for the search palm print image; obtaining a reference template that identifies a plurality of distinctive reference orientation blocks within a reference orientation field for a reference palm print image; identifying, for each of the distinctive search orientation blocks, a mated distinctive reference orientation block from among the plurality of distinctive reference orientation blocks; comparing one or more regions of the search orientation field that includes at least one distinctive search orientation block with one or more corresponding regions of the reference orientation field that includes at least one distinctive reference orientation block that correspond to the at least one distinctive search orientation block; computing an orientation similarity score between the search palm print image and the reference palm print image based at least on comparing the one or more regions of the search orientation field and the one or more regions of the reference orientation field; and determining that the computed orientation score satisfies a predetermined threshold value.

Other versions include corresponding systems, and computer programs, configured to perform the actions of the methods encoded on computer storage devices.

One or more implementations may include the following optional features. For example, in some implementations, each distinctive search orientation blocks indicates a respective ridge flow direction in a spatial location within the search orientation field corresponding to each distinctive orientation block; and each distinctive reference orientation blocks indicates a respective ridge flow direction in a spatial location within the reference orientation field corresponding to each distinctive orientation block.

In some implementations, the one or more regions of the search orientation field includes a plurality of neighboring search orientation fields for the at least one distinctive search orientation field; the one or more regions of the reference orientation field includes a plurality of neighboring reference orientation fields for the at least one distinctive reference orientation field; and comparing the one or more regions of the search orientation field and the one or more regions of the reference orientation field includes: identifying, for each of the plurality of neighboring search orientation blocks, a respective mated neighboring reference orientation block; comparing the respective ridge flow directions indicated by each of the at least one distinctive search orientation blocks, and the respective ridge flow directions indicated by each of the mated distinctive reference orientation blocks; and comparing the respective ridge flow directions indicated by each of the neighboring search orientation blocks, and the respective ridge flow directions indicated by each of the mated neighboring reference orientation blocks.

In some implementations, an orientation similarity score between the search palm print image and the reference palm print image includes: computing, for each of the one or more regions of the search orientation field, a respective orientation similarity score based at least on: (i) comparing the respective ridge flow direction indicated by each of the at least one distinctive search orientation blocks, and the respective ridge flow directions indicated by each of the mated distinctive reference orientation blocks, and (ii) comparing the respective ridge flow directions indicated by each of the neighboring search orientation blocks, and the respective ridge flow directions indicated by each of the mated neighboring reference orientation blocks; and selecting the respective orientation similarity score with the greatest value as the orientation similarity score between the search orientation field and the reference orientation field.

In some implementations, comparing the one or more regions of the search orientation field and the one or more regions of the reference orientation field based on iteratively comparing one or more regions of a particular down-sampled search orientation field and the one or more regions of the reference orientation field, each iterative comparison including: generating a down-sampled search orientation field that has a particular resolution lower than the original resolution of the search orientation field; computing a respective similarity score for each of the one or more regions of the down-sampled search orientation field and a corresponding mated region of the reference orientation field; and selecting a subset of top-ranked distinctive search orientation blocks based at least on the computed values of the respective similarity scores for each of the one or more regions of the down-sampled search orientation field and a corresponding mated region of the reference orientation field.

In some implementations, the selected subset of top-ranked distinctive search orientation blocks of each successive iterative comparison includes a smaller number of distinctive search orientation blocks compared to the selected subset of top-ranked distinctive search orientation blocks of the preceding iterative comparison.

In some implementations, the down-sampled search orientation field generated at each successive iterative comparison has a lower resolution compared to the resolution of the down-sampled search orientation field generated at the preceding iterative comparison.

In some implementations, the down-sampled search orientation field is generated during an enrollment stage of the search palm print image.

In some implementations, the obtained reference template further identifies (i) a plurality of reference minutiae, and (ii) for each reference minutia, a corresponding reference octant feature vector, and further includes: determining one or more transformation parameters between the search orientation field and the reference orientation field based at least on comparing one or more regions of the search orientation field and the one or more corresponding regions of the reference orientation field; aligning, using the one or more transformation parameters, the search palm print image to a coordinate system associated with the reference palm print image, the aligned search palm print image including an overlapping region between the aligned palm print image and the reference palm print image; identifying a plurality of search minutiae within the overlapping region of the aligned search palm print image; generating a search octant feature vector for each minutia within the identified plurality of search minutiae; identifying, for each generated search octant feature vector, a mated reference octant feature vector from among the plurality of reference octant feature vectors; comparing one or more features indicated by each search octant feature vector and one or more corresponding features indicated by each mated reference octant feature vector; and computing a match similarity score between the search palm print and the reference palm print based at least on comparing one or more features indicated by each search octant feature vector and one or more corresponding features indicated by each mated reference octant feature vector.

In some implementations, the method includes identifying the plurality of distinctive search orientation blocks, including: generating, for the search palm print image, a search orientation field representing a plurality of ridge flow directions associated with particular spatial locations within the search palm print image; and identifying a plurality of search orientation blocks within the generated search orientation field, each search orientation block indicated one ridge flow direction associated with a particular spatial location within the search palm print image; determining, for each of the plurality of search orientation blocks, a respective score representing an orientation difference between a particular search orientation block and a set of adjacent orientation blocks; and identifying a subset of the plurality of search orientation blocks that are determined to have a respective score that satisfies a predetermined threshold value.

In some implementations, the mated distinctive reference orientation block is identified from among the plurality of distinctive reference orientation blocks based at least on comparing local geometric attributes associated the one or more regions of the search orientation field to local geometric attributes associated with one or more regions of the reference orientation field.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1A:
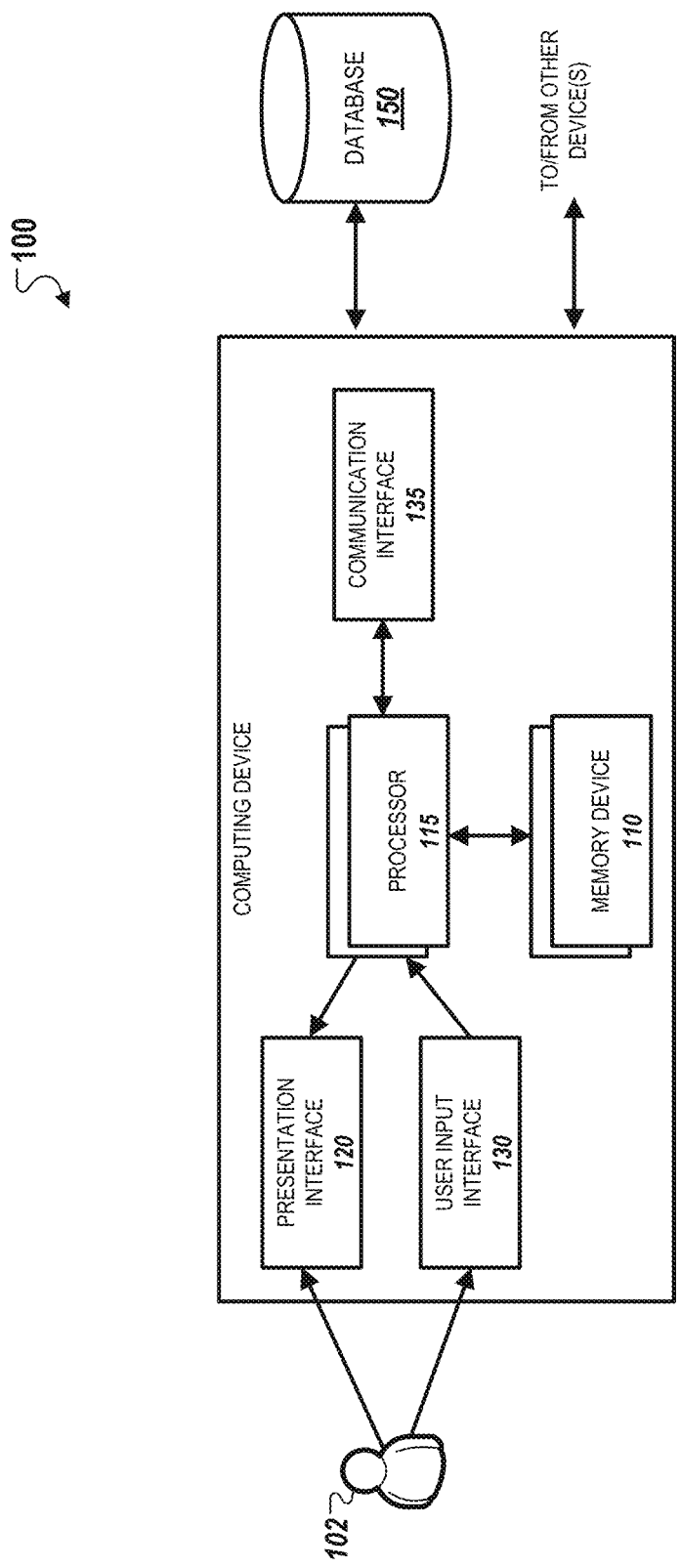
FIG. 1A illustrates a block diagram for an automatic fingerprint identification system.

In general, one innovative aspect described throughout this specification includes systems and techniques capable of increasing the speed and accuracy of matching two palm print images. The palm print matching techniques include a two-step process that involving an orientation image matching procedure to align two palm print images, followed by minutiae matching procedure to determine whether geometric features between the two palm prints correspond to determine a success match.

During the orientation matching procedure, the system initially computes respective orientation similarity score between a search palm print template and a set of pre-generated reference palm print templates. The orientation similarity score is used to distinguish between reference palm prints that are likely to be mated with the search palm print (e.g., reference palm print templates with a computed orientation satisfying a predetermined threshold), and other reference palm prints that are likely to be different from the search palm prints. The system then computes transformation parameters for the mated reference templates based on the alignment procedure. The transformation parameters indicate geometric adjustments to the search palm print template to maximize the number of corresponding minutiae between the transformed search palm print and a mated reference palm print template.

During the minutiae matching procedure, the computed transformation parameters are used to generate a set of transformed search palm print templates that are aligned to each of the reference palm print templates identified in the orientation matching procedure. The system then identifies a set of mated minutiae within each transformed search palm print image and its corresponding reference palm print image. Geometric features associated with each of the mated minutiae are then compared in order to compute a match score that reflects a similarity between the search palm print image and the corresponding reference palm print image. The reference palm print images with the greatest similarity scores are then identified as potential match candidates for the search palm print image.

The following detailed description of the implementations of the disclosure refers to the accompanying drawings. The same reference numbers in different drawings may identify the same or similar elements. In addition, the following detailed description provides exemplary implementations of the concepts described within the claims, and should not be read as to limit their scope.

As described, "alignment" or "registration" refers to a process of positioning two palm prints relative to one another to identify a maximum of number of corresponding minutiae between two palm print images. For instance, a search palm print may be rotated and/or transformed relative to the coordinate system of a reference palm print to identify mated minutiae between the reference palm print image and transformed search palm print image.

An "overlapping region" of two palm prints refer to an intersecting area of two palm prints after performing an alignment procedure. The overlapping region of two palm prints are used to identify mated minutiae between the two palm print images, and/or identify geometrically consistent regions between the two palm prints.

An "orientation field" of a palm print image refers to an image that represents a set of orientation directions corresponding to ridge flow directions of a selected area of a palm print image. The dimensionality of the orientation field can be scaled down by reducing the number of orientation directions included within the orientation field. The dimensionality may be quantized into different scales (e.g., sixteen by sixteen pixels). The scaled orientation field can be referred to as an "orientation block," which represents a set of individual ridge flow directions.

A "minutiae" represent major features of a fingerprint, which are used in comparisons of the reference fingerprint to the search fingerprint to determine a fingerprint match. For example, common types of minutiae may include, for example, a ridge ending, a ridge bifurcation, a short ridge, an island, a ridge enclosure, a spur, a crossover or bridge, a delta, or a core.

A "similarity score" is a measurement of the similarity of the fingerprint features (e.g., minutiae) between the search record and each reference record, represented as a numerical value to degree of similarity. For instance, in some implementations, the values of the similarity score may range from 0.0 to 1.0, where a higher magnitude represents a greater degree of similarity between the search record and the reference record.

System Architecture

FIG. 1A is a block diagram of an exemplary automatic palm print identification system (APIS) 100. Briefly, the APIS 100 may include a computing device including a memory device 110, a processor 115, a presentation interface 120, a user input interface 130, and a communication interface 135. The APIS 100 may be configured to facilitate and implement the methods described through this specification. In addition, the APIS 100 may incorporate any suitable computer architecture that enables operations of the system described throughout this specification.

The processor 115 may be operatively coupled to memory device 110 for executing instructions. In some implementations, executable instructions are stored in the memory device 110. For instance, the APIS 100 may be configurable to perform one or more operations described by programming the processor 115. For example, the processor 115 may be programmed by encoding an operation as one or more executable instructions and providing the executable instructions in the memory device 110. The processor 115 may include one or more processing units, e.g., without limitation, in a multi-core configuration.

The memory device 110 may be one or more devices that enable storage and retrieval of information such as executable instructions and/or other data. The memory device 110 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

The memory device 110 may be configured to store a variety of data including, for example, matching algorithms, scoring algorithms, scoring thresholds, perturbation algorithms, fusion algorithms, virtual minutiae generation algorithms, minutiae overlap analysis algorithms, and/or virtual minutiae analysis algorithms. In addition, the memory device 110 may be configured to store any suitable data to facilitate the methods described throughout this specification.

The presentation interface 120 may be coupled to processor 115. For instance, the presentation interface 120 may present information, such as a user interface showing data related to fingerprint matching, to a user 102. For example, the presentation interface 120 may include a display adapter (not shown) that may be coupled to a display device (not shown), such as a cathode ray tube (CRT), a liquid crystal display (LCD), an organic LED (OLED) display, and/or a hand-held device with a display. In some implementations, the presentation interface 120 includes one or more display devices. In addition, or alternatively, the presentation interface 120 may include an audio output device (not shown), e.g., an audio adapter and/or a speaker.

The user input interface 130 may be coupled to the processor 115 and receives input from the user 102. The user input interface 130 may include, for example, a keyboard, a pointing device, a mouse, a stylus, and/or a touch sensitive panel, e.g., a touch pad or a touch screen. A single component, such as a touch screen, may function as both a display device of the presentation interface 120 and the user input interface 130.

In some implementations, the user input interface 130 may represent a fingerprint scanning device that is used to capture and record fingerprints associated with a subject (e.g., a human individual) from a physical scan of a finger, or alternately, from a scan of a latent print. In addition, the user input interface 130 may be used to create a plurality of reference records.

A communication interface 135 may be coupled to the processor 115 and configured to be coupled in communication with one or more other devices such as, for example, another computing system (not shown), scanners, cameras, and other devices that may be used to provide biometric information such as fingerprints to the APIS 100. Such biometric systems and devices may be used to scan previously captured fingerprints or other image data or to capture live fingerprints from subjects. The communication interface 135 may include, for example, a wired network adapter, a wireless network adapter, a mobile telecommunications adapter, a serial communication adapter, and/or a parallel communication adapter. The communication interface 135 may receive data from and/or transmit data to one or more remote devices. The communication interface 135 may be also be web-enabled for remote communications, for example, with a remote desktop computer (not shown).

The presentation interface 120 and/or the communication interface 135 may both be capable of providing information suitable for use with the methods described throughout this specification, e.g., to the user 102 or to another device. In this regard, the presentation interface 120 and the communication interface 135 may be used to as output devices. In other instances, the user input interface 130 and the communication interface 135 may be capable of receiving information suitable for use with the methods described throughout this specification, and may be used as input devices.

The processor 115 and/or the memory device 110 may also be operatively coupled to the database 150. The database 150 may be any computer-operated hardware suitable for storing and/or retrieving data, such as, for example, pre-processed fingerprints, processed fingerprints, normalized fingerprints, extracted features, extracted and processed feature vectors such as octant feature vectors (OFVs), threshold values, virtual minutiae lists, minutiae lists, matching algorithms, scoring algorithms, scoring thresholds, perturbation algorithms, fusion algorithms, virtual minutiae generation algorithms, minutiae overlap analysis algorithms, and virtual minutiae analysis algorithms.

The database 150 may be integrated into the APIS 100. For example, the APIS 100 may include one or more hard disk drives that represent the database 150. In addition, for example, the database 150 may include multiple storage units such as hard disks and/or solid state disks in a redundant array of inexpensive disks (RAID) configuration. In some instances, the database 150 may include a storage area network (SAN), a network attached storage (NAS) system, and/or cloud-based storage. Alternatively, the database 150 may be external to the APIS 100 and may be accessed by a storage interface (not shown). For instance, the database 150 may be used to store various versions of reference records including associated minutiae, octant feature vectors (OFVs) and associated data related to reference records.

Palm Print Matching

In general, palm print matching describes the process by which the APIS 100 compares features of a search palm print to features of a set of reference palm prints in order to make a match determination. In a 1:1 comparison, a candidate search palm print image expected to be associated with a known identity is compared against a corresponding stored reference palm print associated with the known identity in order to determine whether the candidate search palm print image is actually associated with the known identity. These techniques are often used for a palm print identify verification operation.

In a 1:N comparison, a candidate search palm print image with an unknown identity is compared against a set of reference palm prints that are each associated with different identities. These techniques are often used to identify a particular reference palm print that matches the candidate search palm print image in order to identify the identity associated with the candidate search palm print.

The systems and techniques described below are applicable to both 1:1 and 1:N operations. However, for simplicity, the descriptions are focused on 1:N operations where computational resources necessary to perform a palm print identification operation are important due to the number of comparisons performed by the APIS 100.

Figure 1B:
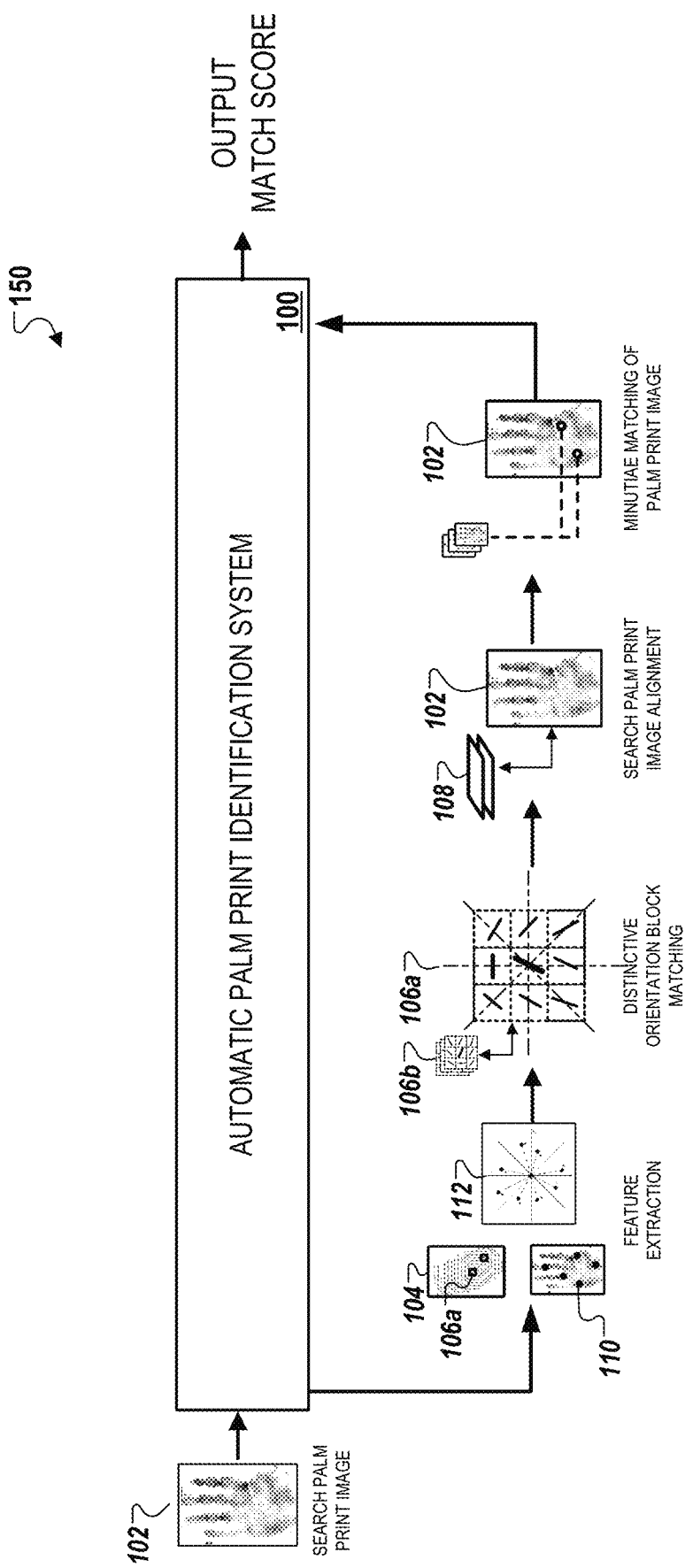
FIG. 1B illustrates a conceptual diagram of an exemplary palm print matching procedure.

FIG. 1B is a block diagram of an exemplary palm print matching operation 150. The APIS 100 initially receives a search palm print image 102. The APIS 100 then performs a feature extraction process for the search palm print image 102. For instance, the APIS 100 generates an orientation field 104 representing the ridge flow directions within the search palm print image 102, extracts minutiae 110 within the search palm print image 102, and generates octant feature vectors (OFVs) 112 for each of the extracted minutiae 110.

Referring initially to generation of the orientation field 104, the APIS 100 evaluates relationships between the arrangements of individual ridge flow directions within the orientation field 104 in order to identify a set of distinctive orientation blocks 106. More particular descriptions related to distinctive orientation block calculation are provided below with respect to FIG. 4.

Referring now to minutiae extraction, after obtaining minutiae from the transformed search palm print images and the corresponding reference palm print images, the APIS 100 then obtains OFVs 112 for each of the minutiae. The OFVs encode relative geometric relationships between a particular minutia and its eight nearest octant sector minutiae to form a rotation and translation invariant feature vector. Only the OFVs of minutiae within the overlapping area are then compared against the OFVs of the corresponding local area in the overlapping area of the reference in order to calculate a match similarity score that represents the likelihood that the corresponding reference palm print image associated with the reference template is a match for the search palm print image. More particular descriptions related to minutiae matching techniques are described below with respect to FIGS. 6-11.

The APIS 100 then obtains a set of reference palm print templates from storage. Each reference palm print template is associated with a particular reference palm print image and identifies (i) a set of reference minutiae extracted from the particular reference palm print image, (ii) a set of OFVs corresponding to the set of reference minutiae, and (iii) a set of distinctive reference orientation blocks within the orientation field of the particular reference palm print image. More particular descriptions related to the generation and storage of the reference palm print templates are provided below with respect to FIG. 2.

The APIS 100 then compares the distinctive search orientation blocks 106*a* with the distinctive reference orientation blocks 106*b* associated with each of the reference palm print templates. The comparisons are then used to compute respective orientation similarity scores between the search palm print template and each of the obtained reference palm print templates. The values of the computed orientation similarity scores are then compared against a threshold value to identify a set of reference templates 108 that have a computed orientation similarity score that satisfies the threshold.

The comparisons of the distinctive search orientation blocks 106*a* and the distinctive reference orientation blocks 106*b* are also used to determine a set of transformation parameters that reflect adjustments to the search palm print image, relative to each of the reference palm print templates 108, in order to maximize the overlapped region between the transformed search palm print image and a corresponding reference palm print image.

The APIS 100 then uses the transformation parameters to perform align the search palm print image 102 according to the coordinate systems of each of the set of reference palm print templates 108 that are identified to have an orientation similarity score that satisfies the predetermined threshold. In this regard, the alignment procedure is coarsely performed only for those reference templates that have a high likelihood of representing a match candidate, reducing the number of alignment procedures needed performed for the search palm print image 102. After the alignment procedure, the APIS 100 generates set of transformed search input images that are each aligned to a corresponding reference template within the set of reference templates 108. More particular descriptions related to the calculation of orientation similarity scores, the computation of the transformation parameters, and the alignment procedure using the computed transformation parameters are provided below with respect to FIG. 5A.

The APIS 100 then identifies the overlapping regions between each transformed search palm print image and its corresponding reference image. As described above, the overlapping region represents an area within a particular transformed search palm print image and its corresponding reference palm print image that shares certain local geometric features (e.g., number of mated minutiae, common ridge flow patterns, etc.). The APIS 100 then obtains search minutiae within the overlapping region of each transformed search palm print image, and reference minutiae within the overlapping regions of the corresponding reference image.

In some implementations, the feature vectors included within the OFVs may be described using feature vector that is represented by $Mf_i=(x_i, y_i, \theta_i)$. The feature vector $Mf_i$ includes a minutia location that is defined by coordinate geometry such as $(x_i, y_i)$, and a minutiae direction that is defined by the angle $\theta_i \in [0, 2\pi]$. In other examples, further minutiae characteristics such as quality, ridge frequency, and ridge curvature may also be used to describe feature vector Mf$_r$. The extracted feature vectors are used to generate the OFVs for each of identified minutia within the search and reference palm prints.

Reference Palm Print Generation

Figure 2:
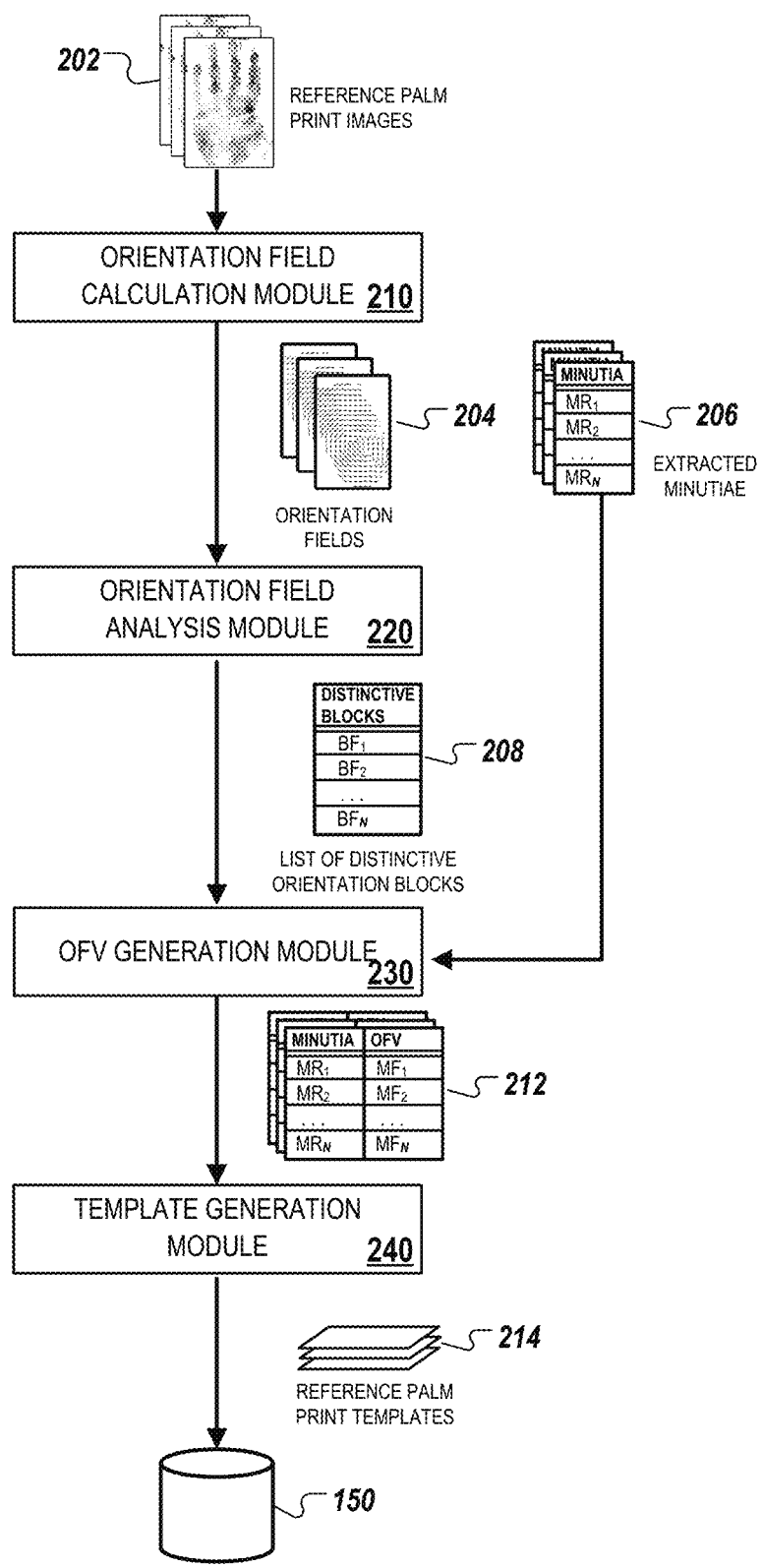
FIG. 2 illustrates a conceptual diagram of an example of a process for generating reference palm print templates.

FIG. 2 illustrates a conceptual diagram of an example of a system 200 that references reference palm print templates prior to a palm print matching operation. The system 200 generally includes an orientation field calculation module 210, an orientation field analysis module 220, an OFV generation module 230, and a template generation module 240. In some instances, the system 200 may be a component within the APIS 100. Alternatively, in other instances, the system 200 may be a separate component that is instead configured to exchange communications with the APIS 100 and generated reference palm print templates in the database 150.

The orientation field calculation module 210 initially receives a set of reference palm print images 202. The set of reference palm print images 202 can represent previously collected palm print images that are determined to be associated with a known identity. For example, the set of reference palm print images 202 can be palm print images that are collected from users that enrolled into a particular biometric program.

The orientation field calculation module 210 then calculates an orientation field 204 for each reference image, and a set of extracted minutiae 206 during a feature extraction process. As described above, the orientation fields 204 represent the different ridge flow directions that are present within each of the reference palm print images 202. The extracted minutiae represent distinctive points within each reference palm print image that are associated with a minutia orientation and a minutia direction.

In some implementations, the orientation field calculation module 210 may process the generated orientation fields 204 to reduce the file size of each orientation field. For example, the ridge flow directions of each orientation field can be quantized into smaller range values using image or data compression techniques to compress the orientation field. As an example, the orientations of four ridge flow directions can be averaged together to generate a single average ridge flow direction to be representative of the four individual ridge flow directions. This process can be iteratively performed for various regions within the orientation fields 204 to generate processed orientation fields that include a smaller number of averaged ridge flow directions.

The orientation field analysis module 220 then identifies a list of distinctive orientation blocks 208 within each of the generated orientation fields 204. The list of distinctive orientation blocks 208 include orientation blocks that are associated with unique areas and/or locations within each of the reference palm print images 202. For example, as described more particularly with respect to FIG. 4, a particular orientation block may be selected as a distinctive orientation block if it is determined to have a different orientation compared to neighboring orientation blocks within a generate orientation field. The list of distinctive orientation blocks 208 are used to indicate uniquely identifiable locations within each reference palm print image that are not likely to be in any of the other palm print images. Thus, during a palm print matching operation, the distinctive orientation blocks of each of the reference palm print images can be compared against the distinctive orientation blocks of a search palm print image to quickly identify potential match candidates without necessarily comparing each region within the respective reference and search orientation fields.

The OFV generation module 230 then generates OFVs for each minutia included within the list of extracted minutiae 206. For instance, as described more particularly with respect to FIG. 2, the OFVs are generated based on comparing a minutia to its nearest neighboring minutiae within each octant, and generating feature vectors for each octant based on the comparison. The generated OFVs are rotation and translation invariant, and are useful in performing minutiae matching operations where an OFV for a search minutia is compared against an OFV for a corresponding reference minutia to determine a match similarity score.

The template generation module 240 finally generates a set of reference palm print templates 214 corresponding to each of the reference palm print images 202. Each reference palm print template 214 includes the list of extracted minutiae 206, the list of distinctive orientation blocks 208, and the octant feature vectors 212 corresponding to the list of extracted minutiae 206. In this regard, the reference palm print templates 214 can be generated offline and stored in the database 150, and subsequently accessed by the APIS 100 during an online palm print matching operation of a search palm print image.

Palm Print Matching Overview

Figure 3:
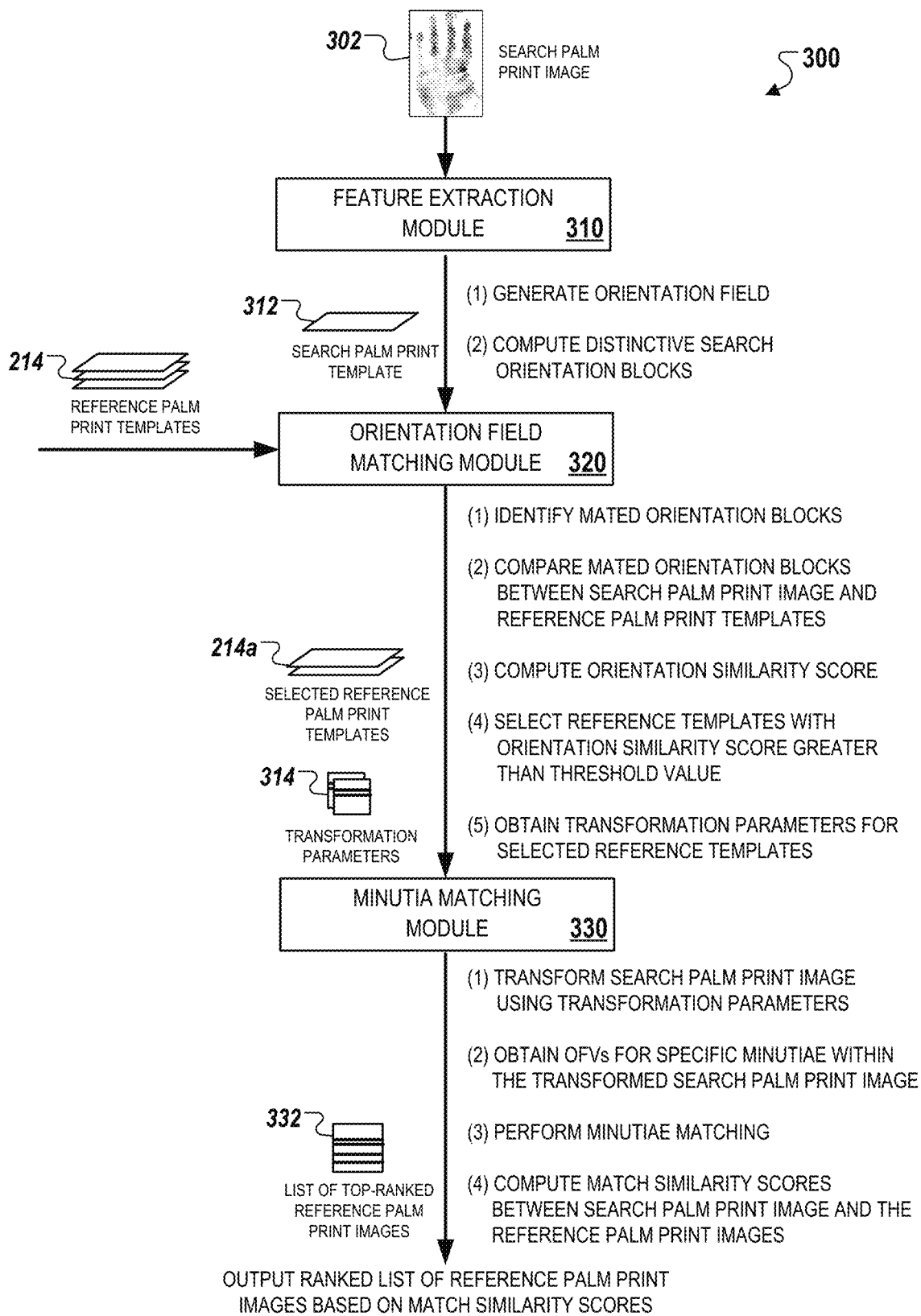
FIG. 3 illustrates a conceptual diagram of a system for performing a palm print matching operation.

FIG. 3 provides an overview of a system 300 for performing an online palm print matching operation of a search palm print image 302. The system 300 can be a software component of the APIS 100. The system 300 includes a feature extraction module 310, an orientation image matching module 320, and a minutia matching module 330. In the example depicted in FIG. 3, the system 300 performs a 1:N matching operation in which the search palm print image 102 is compared against a set of reference palm print templates 214. As described above, once the features of the search palm print image 302 have been extracted, the matching operation generally includes orientation image matching, and minutiae matching between a search palm print image template 312 and each of the reference palm print templates 214.

Initially, the feature extraction module 310 generates an orientation filed for the search palm print image 302, and then identifies a set of distinctive search orientation blocks using similar technique described previously with respect to FIG. 2. The list of distinctive search orientation blocks is then included within the search palm print template 312 and provided to the orientation image matching module 320.

The orientation field matching module 320 then obtains the set of reference palm print templates 214 that were generated and stored by the system 200. As described above, each obtained reference template includes a list of reference minutiae, OFVs corresponding to each of the minutiae, and a set of distinctive reference orientation blocks.

Upon receiving the search palm print template 312, the orientation field matching module 320 then compares the each of the respective distinctive search and reference orientation fields to identify mated orientation blocks. A mated orientation block can refer to a pair of distinctive search and reference orientation blocks that are likely to refer to similar regions within a palm print image. For example, as described above, because each of the distinctive orientation blocks represent uniquely identifiable information associated with a particular palm print, the mated orientation blocks (e.g., orientation blocks that share similar orientations and variances with neighboring orientation blocks) can be used to identify coarse match candidates within the set of reference palm print templates 214.

The orientation field matching module 320 then compares attributes associated with mated orientation blocks from the search palm print template 312 with the corresponding reference palm print template. For instance, the orientation field matching module 320 may compare the orientation differences between neighboring orientation blocks of the distinctive search and reference orientation blocks. The calculated orientation differences for corresponding blocks within a local region can then be combined compute an orientation similarity score. This process can be iteratively performed for various coarse and fine levels of the search palm print image 202.

The orientation field matching module 320 then compares each of the computed orientation similarity scores with a threshold value and then selects a set of reference templates 214a from among the reference palm print templates 214 that have a computed orientation similarity score that satisfies the threshold. The selected reference palm print templates 214a are associated with reference palm print images that have a minimum-level orientation similarity with the search palm print image 302 at or near locations associated with the distinctive orientation blocks. The remaining reference templates within the set of reference palm print templates 214 are determined by the orientation field matching module 320 to be unlikely to represent a match candidate with the search palm print image 302. This discrimination process is used to conserve computational resources by limiting the amount of processing required during subsequent matching procedures (e.g., during the minutiae matching procedure) only to the reference palm print templates 214a that are determined to have a high likelihood of being a candidate match.

The orientation field matching module 320 then computes a set of transformation parameters 314 for the selected reference templates 314a that have computed orientation similarity score that is greater than the predetermined threshold. As described more particularly with respect to FIG. 5A, the transformation parameters 314 can include an optimal rotation and an optimal translation to maximize the overlapping region between the search palm print image 302 and a corresponding reference palm print image. The selected reference palm print images 214a and their corresponding transformation parameters 314 are then transmitted to the minutiae matching module 330.

The minutiae matching module 330 then uses the transformation parameters 314 to generate a set of transformed search palm print images that are aligned to each of the selected reference templates 214a. The minutiae matching module 330 then identifies local minutiae within the overlapping region of the transformed search palm print image, and generates an OFV for each local minutia.

The minutiae matching module 330 analyzes the local geometric features associated with the transformed search palm print image and the corresponding reference palm print image to identify all possible mated minutiae pairs that each include a set of search minutiae and a set of reference minutiae that are determined to correspond to the set of search minutiae. The OFVs of the individual minutiae within the mated minutiae pairs are then analyzed to compute match similarity scores between the search palm print image 302 and each of the reference palm print images associated with the selected reference palm print templates 214a.

The minutiae matching module 330 then generates a ranked list of reference palm print images 322 based on the values of the respective match similarity scores computed for each of the selected reference palm print templates 214a. For instance, the minutiae matching module 330 may select the reference palm print templates with the top N match similarity scores and include these selected reference templates with the list 332. This list identifies the reference palm print images that are most likely to be a match for the search palm print image 302.

Figure 4:
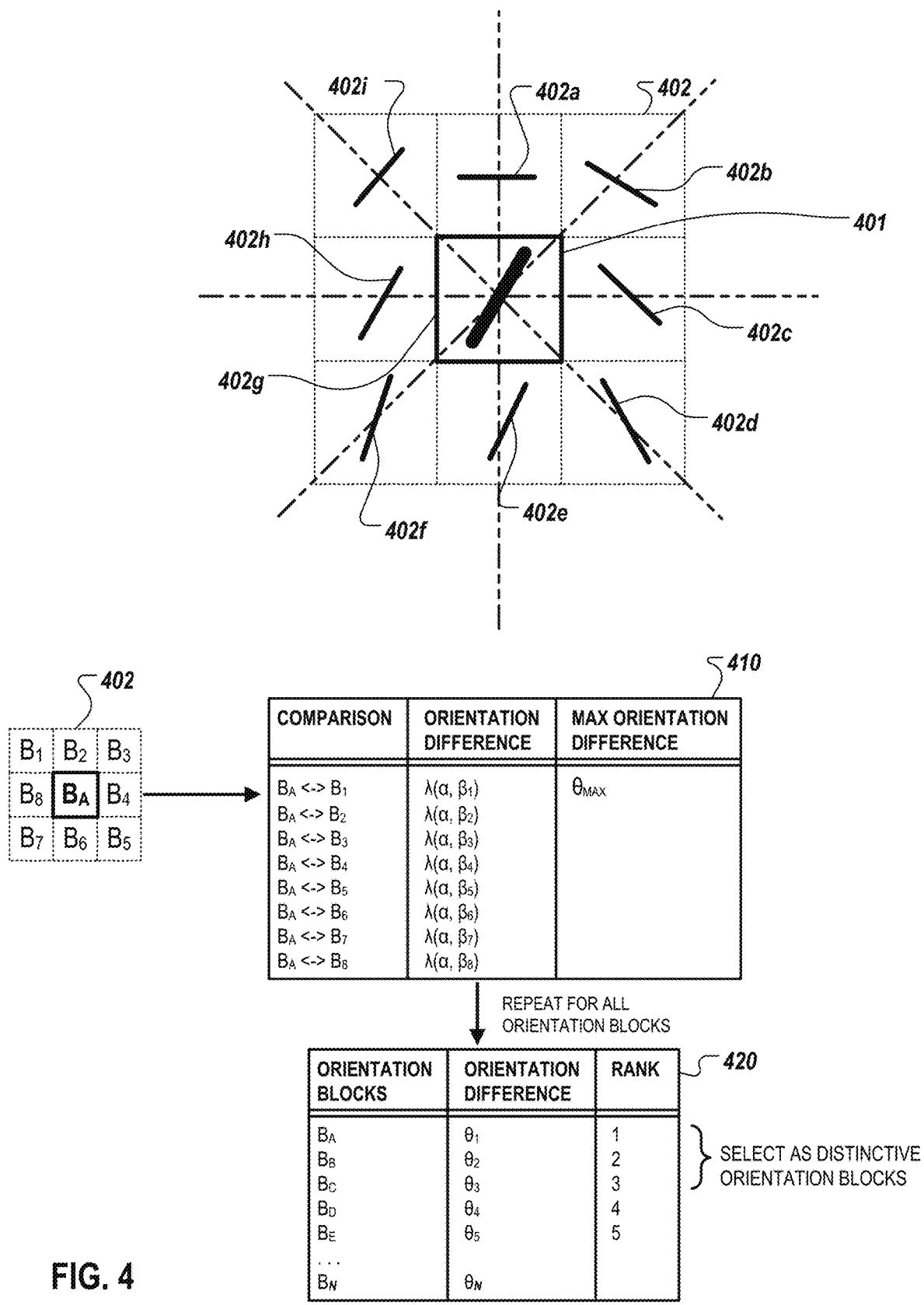
FIG. 4 illustrates a conceptual diagram of an example of a process for selecting distinctive orientation blocks for a search palm print image.

Although FIG. 3 provides a high-level overview of the entire palm print matching process, detailed descriptions related to orientation field matching procedure and the minutiae matching module are provided below. FIGS. 4, and 5 provide examples of concepts and techniques related to orientation field matching. FIGS. 6-11 provide examples of concepts and techniques related to minutiae matching.

Orientation Field Matching

FIG. 4 illustrates a conceptual diagram of an example of a process for selecting distinctive orientation blocks for a search palm print image. As depicted, an orientation field window 402 may include multiple orientation blocks that include ridge flow directions 402a-i surrounding a central orientation block 401. The orientation field window 402 may represent a portion of an orientation field generated for a palm print image (e.g., the search palm print image 302). Although the orientation field window 402 includes a three-by-three field window, in other examples, other window sizes can be used. For instance, in one particular implementation, a five-by-five field window can be used.

In order to identify the distinctive orientation blocks within a generated orientation field, the orientation field matching module 320 compares the orientation differences between the ridge flow direction of the central block 101 (or block $B_A$) to each of the ridge flow directions 402a-i of the blocks $B_1$-$B_5$. For instance, the orientation field matching module 320 generates a table 410 that specifies an orientation difference between the block $B_A$ and each individual neighboring block.

In the table 410, the orientation difference represents the absolute value of the angle of orientation of the central block ($\alpha$) and the angle of orientation of each neighboring block ($\beta_i$, where i represents the index of the neighboring block). The table 410 also specifies a maximum orientation difference, which can be represented as the maximum orientation difference ($\theta_{max}$) computed between a central block and an individual orientation black within a particular orientation field window. In other instances, the maximum orientation difference may instead be computed by combining the individual measurements for the orientation difference (e.g., by computing an average orientation difference within a particular orientation field window.

The orientation field matching module 320 then repeats the process described above for each orientation block within the orientation field generated for a palm print image in order to generate the table 420. The table 420 specifies a ranked list of the maximum orientation differences for each orientation block within an orientation field. The orientation blocks with the greatest orientation differences are then selected as the distinctive orientation blocks for the orientation field.

In some implementations, instead of iteratively computing the maximum orientation difference for each orientation block within an orientation field, the orientation field matching module 320 may instead pre-process the generated orientation field to reduce the number of orientation blocks included. For instance, as described above, the orientation field matching module 320 may quantize the orientation field by combining a number of ridge flow directions within specified locations into a single ridge flow direction that represents a composite ridge flow direction (e.g., replacing a quadrant of individual ridge flow directions with a single orientation block with a composite ridge flow direction that is computed by combining the individual ridge flow directions).

Figure 5A:
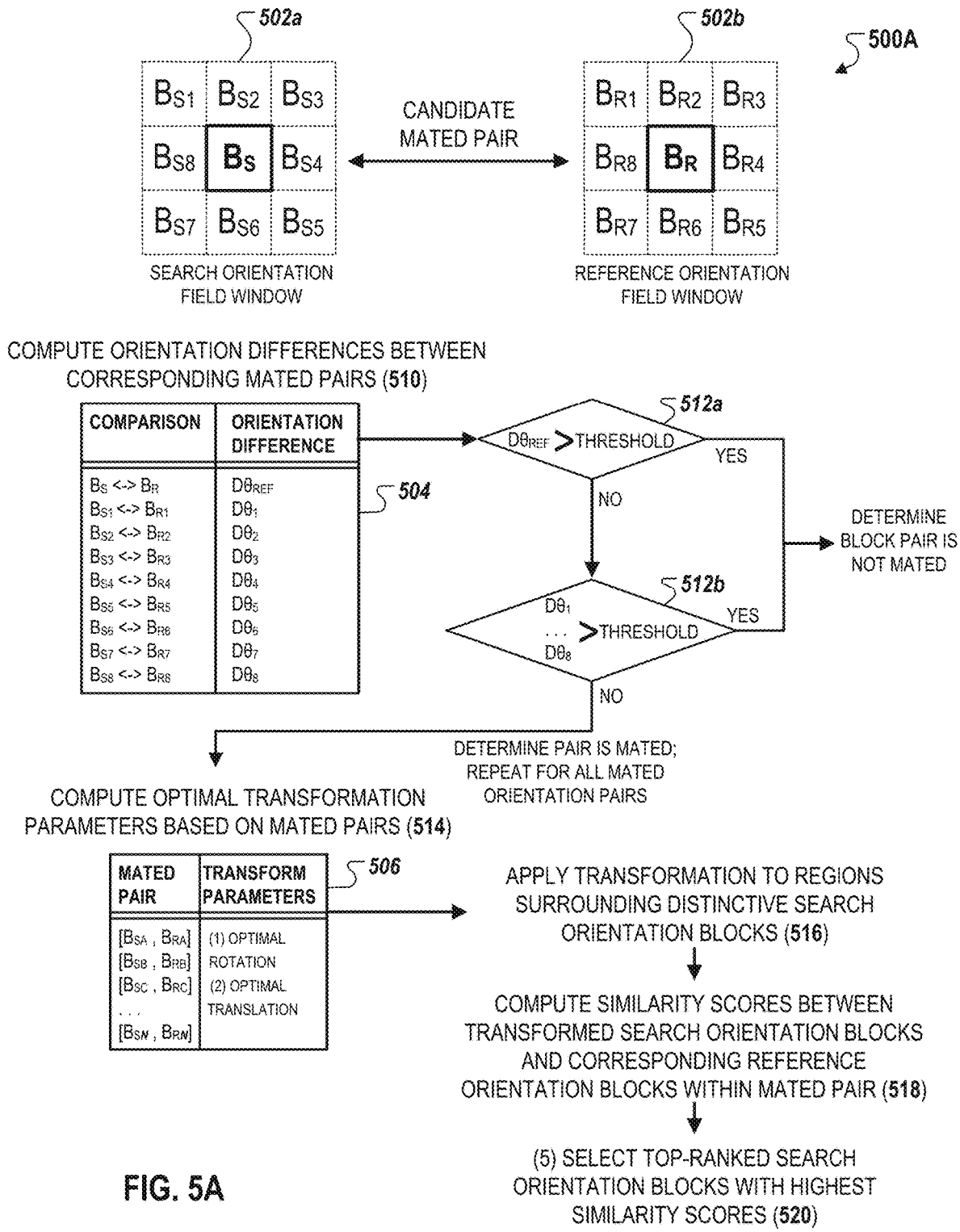
FIG. 5A illustrates a conceptual diagram of an example of a process that compares a set of mated search and reference orientation blocks.
Figure 5B:
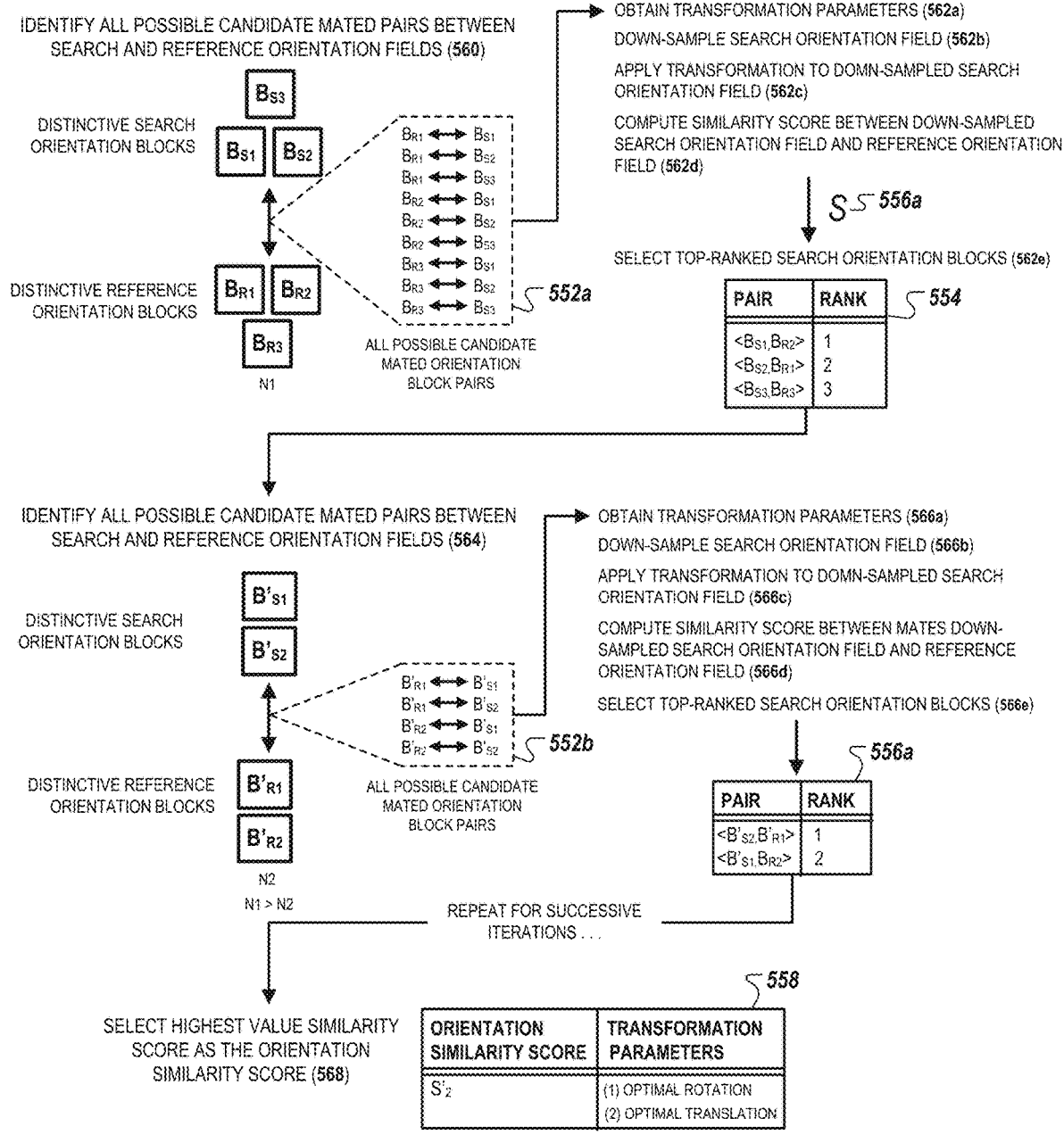
FIG. 5B illustrates an iterative process that is used to verify the global consistency of the top-ranked orientation blocks.

FIGS. 5A-5B illustrates conceptual diagrams of examples of processes for comparing mated orientation blocks including a search orientation block and a reference orientation block. FIG. 5A depicts a process 500A for comparing individual search and reference orientation field windows that each include a distinctive orientation block, which is then repeated for all distinctive search orientation blocks to identify a set of top-ranked mated pairs of search and reference orientation blocks. FIG. 5B depicts an iterative process 500B that is used to verify the global consistency of the top-ranked orientation blocks identified after performing the process 500A, and then computing an overall orientation similarity score between the search and reference orientation fields.

Referring initially to FIG. 5A, the process 500A includes computing orientation differences for corresponding orientation blocks with a candidate mated orientation field window (510), and determining if the computed orientation differences exceed one or more threshold values (512a, 512b). If the candidate mated orientation field window is determined to be actually mated, then the process 500A includes computing optimal transformation parameters based on each of the orientation field windows that are determined to be mated (514), applying the transformation parameters to regions surrounding the distinctive orientation blocks (516) computing similarity scores between transformed search orientation blocks and corresponding reference orientation blocks within the mated orientation block window (518), and selecting top-ranked orientation block pairs with the highest similarity scores (520).

In more detail, the orientation field matching module 320 initially identifies a candidate mated orientation field window pair that includes a distinctive search orientation block $B_S$ and a distinctive reference orientation block $B_R$. These two orientation blocks may be included within local orientation field views 502a and 502b, respectively that also include neighboring orientation blocks (e.g., $B_{S1}$-$B_{S8}$ for the search orientation block, and $B_{R1}$-$B_{R8}$ for the reference orientation block).

In order to determine whether the orientation blocks $B_S$ and $B_R$ are actually mated, the orientation filed matching module 320 determines whether the orientation blocks $B_S$ and $B_R$ are geometrically consistent with one another. If the orientation blocks $B_S$ and $B_R$ are geometrically consistent, then each of corresponding neighboring orientation blocks within the orientation field windows 502a and 502b should also be geometrically consistent with one another. As such, the orientation field matching module 320 compares the geometric attributes between $B_S$ and $B_R$, and each pair of neighboring blocks, as shown in table 504.

The orientation field matching module 320 initially identifies the first neighboring block to compare based on the ridge flow directions of each the orientation fields $B_R$ and $B_S$. For instance, the orientation field matching module 320 selects the particular neighboring orientation block faces the direction of the ridge flow direction included within each of the orientation blocks $B_R$ and $B_S$. The remainder of the corresponding mated block pairs is sequentially identified in a clockwise fashion from the first identified neighboring block pair. In the example, $B_{S1}$ and $B_{R4}$ are identified as the first neighboring block pair, and ($B_{S2}$-$B_{S8}$, $B_{R2}$-$B_{R8}$) are then identified as the remaining neighboring block pairs in a clockwise fashion from the pair $B_{S2}$, $B_{R2}$ to the pair $B_{S8}$, $B_{R8}$. This example represents two orientation windows 502a and 502b that are aligned for simplicity, but in other instances, the first neighboring orientation field pair can include different neighboring orientation blocks if the orientation blocks $B_S$ are $B_R$ are rotated relative to one another (e.g., $B_{S2}$ and $B_{R6}$ identified as the first neighboring pair).

In general, the orientation field matching module 320 evaluates each candidate mated pair to verify whether the reference orientation block within the reference orientation field corresponds to the search orientation block specified by the candidate mated pair. This correspondence can be used to determine that a point within the reference palm print image that is associated with particular reference orientation blocks that is aligned with the point within the search palm print image that is associated with the particular search orientation block. The orientation field matching module 320 than uses this point as reference to compute a set of transformation parameters (e.g., rotation and translation) to maximize an overlapping region between the reference palm print image and the transformed search palm print image.

To determine whether the search orientation block $B_S$ and the reference orientation block $B_R$ are actually a mated pair, the orientation field matching module 320 compares the orientation differences (D$\theta$) between these two orientation blocks as well as the orientation differences between the corresponding neighboring orientation blocks (e.g., $B_{S1}$ and $B_{R4}$, $B_{S2}$ and $B_{R2}$, etc.) (510). The orientation field matching module 320 then generates a table 504 that specifies the orientation difference between each comparison between the search orientation field window 502a and the reference orientation field window 502b. As described, above, the orientation difference represents an angular difference, relative to a reference axis, between respective ridge flow directions included within the two orientation blocks within a candidate mated pair.

The orientation field matching module 320 then compares the compute orientation differences specified by the table 504 to a set of threshold values (512a, 512b). For instance, at step 512a, the orientation field matching module 320 determines whether the orientation difference between the search orientation block $B_S$ and the reference orientation block $B_R$ exceeds a threshold value. If the orientation difference exceeds the threshold value, then the orientation field matching module 320 determines that the search and reference orientation blocks within the candidate mated pair are not actually mated. In this instance, the candidate orientation matching module proceeds perform the techniques described above with the next candidate mated pair.

If the value of the orientation difference D$\theta_{REF}$ is determined to be less than the threshold value, then the orientation field matching module 320 proceeds to step 512b. The orientation field matching module 320 then compares each of the values of the orientation differences D$\theta_1$-D$\theta_8$ to a threshold. For instance, if either of the values of the orientation differences is greater than the threshold value, then the orientation field matching module 320 determines that the orientation blocks $B_S$ and $B_R$ are not actually matches, and proceeds to perform the techniques described above with the next candidate mated pair.

In some implementations, the thresholds in step 512a and step 512b may represent the same threshold. In other implementations, the thresholds can instead represent different values corresponding to the differences in sensitivity used in each step. For example, a lower threshold may be used in 512b if there is an increased likelihood that there may be larger orientation differences in the neighboring orientation blocks of the orientation field windows 502a-502b. In other instances, the threshold values used in steps 512a and 512b may be adjusted based on the particular location of the orientation field windows 502a-502b within the respective orientation fields.

If the orientation field matching module 320 determines that each of the orientation differences are below a threshold value, then the orientation filed matching module 320 determines that the candidate mated pair are actually mated, and then proceeds to repeat the techniques described above for each of the other candidate mating pairs. As described more particularly with respect to FIG. 5B, this involves iteratively executing the techniques described above for all possible mated pairs.

Referring briefly to FIG. 5B, the orientation field matching module 320 repeats steps 510, 512a and 512b of the process 500A for all of the possible candidate mated orientation field windows. During the first instance of this process, all of the actually mated orientation field windows are identified (e.g., the candidate mated orientation field windows that are determined to include mated orientation blocks).

The orientation field matching module 320 then uses the geometric arrangement between each of the reference orientation blocks within the reference orientation field, relative to the geometric arrangement between each of the search orientation blocks within the search orientation field, to generate a set of transformation parameters (506). For instance, as depicted in table 506, the transformation parameters include an optimal rotation and an optimal translation that maximizes the area overlapping region specified by the distinctive orientation blocks within the mated pairs. The set of transformation parameters are stored and used in subsequently in the process 500B.

The orientation field matching module 320 then applies a transformation to regions surrounding the distinctive search orientation blocks using the transformation parameters (516). Although the transformation parameters are generated for the entire search orientation field, instead of applying the transformation to the entire search orientation field, the orientation field matching module 320 instead applies the transformation to regions surrounding the distinctive search orientation blocks within the search orientation field. For example, the transformation may be applied to a sixteen-by-sixteen block window surrounding each distinctive search orientation block within the search orientation field. In other examples, larger or smaller windows can also be used to optimize speed for performing the orientation matching procedure relative to the computational resource constraints for executing the procedure.

The orientation field matching module 320 then computes respective similarity scores between the each of the transformed search orientation blocks and the corresponding reference orientation blocks within each mated pair (518). For example, the orientation field matching module 320 may compute similarity scores by combining the measured orientation differences specified in the table 510 and then comparing the combined measurement to a predefined similarity threshold.

After computing the individual similarity scores for each mated pair of reference and search orientation field windows, the orientation field matching module 320 then ranks each mated pair by its similarity score value, and selects the top-ranked mated pairs with the highest similarity score values (520). The search orientation block windows included within top-ranked mated pairs represent regions within the search orientation field that are determined to be most similar to corresponding regions within the reference orientation field. However, because the computed similarity scores reflect local consistency between the search and reference orientation blocks (e.g., indicating similarity with respect to regions specified by the orientation block windows 502a and 502b), the orientation field matching module 320 subsequently executes the process 500B depicted in FIG. 5B to ensure that these top-ranked regions are also globally consistent with one another. As described below, this includes an iterative process in which, at each stage, the search orientation field is down-sampled to finer levels, and the number of selected top-ranked regions are reduced to identify the best-ranked search orientation block.

Referring now to FIG. 5B, an iterative process 500B is used by the orientation field matching module 320 to verify the global consistency of top-ranked orientation blocks identified after performing the process 500A. The output of the process 500A (e.g., the list of top-ranked search orientation blocks based on the respective similarity score values of their corresponding mated pairs) are initially provided as input the process 500B. In the example depicted in FIG. 5B, the orientation field matching module 320 initially identifies three top-ranked mated pairs, which include three search orientation blocks (e.g., $B_{S1}$, $B_{S2}$, $B_{S3}$).

The orientation field matching module 320 then identifies all possible candidate mated pairs between search and reference orientation fields (560). In the example depicted, three search orientation blocks and three reference orientation blocks are individually grouped to identify twelve possible candidate mated orientation block pairs 552a.

The orientation field matching module 320 then performs a set of operations related to ensuring that the top-ranked search orientation blocks are globally consistent with their corresponding reference orientation blocks within the mated pairs within the respective orientation fields (562a-d). For example, as described above, the similarity score calculation technique within process 500A ensures that two orientation blocks within a candidate mated pair are locally consistent within a particular orientation field window, but not for the entire orientation field.

To verify the global consistency of the top-ranked search orientation blocks with their corresponding reference orientation blocks, the orientation field matching module 320 initially obtains the transformation parameters determined in step 514 of process 500A (562a) and then down-samples the search orientation field using a scaling factor (562b). The down-sampled search orientation field has a sampling rate decreased by an integer factor compared to the search orientation field at the original resolution. The orientation field matching module 320 then applies the obtained transformation parameters to the down-sampled search orientation field (562c).

The orientation field matching module 320 then performs the techniques described previously with respect to process 500B to compute respective similarity scores between the distinctive search orientation blocks within the transformed down-sampled search orientation field and their corresponding reference orientation blocks specified by their mated pair. This similarity score computation in step 562d is performed in order to identify the top-ranked search orientation blocks within the down-sampled search orientation field at a coarser level. The identified search orientation blocks, their respective similarity scores, and their corresponding rank are specified within table 554.

The orientation field matching module 320 also computes a similarity score 554a between the down-scaled search orientation filed and the reference orientation field. This similarity score represents a relationship between the number of candidate mated pairs that are identified as actually being mated, and a number of candidate mated pairs that are identified as non-mated pairs. This similarity score 554a is used to reflect the impact of the down-sampling procedure on the identification of top-ranked search orientation blocks. For example, if a search orientation field is actually geometrically consistent with its corresponding reference orientation field, then the similarity score 554a should reflect a minimal difference in the identification of top-ranked search orientation blocks within the original search orientation filed and the down-sampled search orientation field.

After performing a single iteration of the similarity score calculation process (e.g., steps 560 and 562a-d), the orientation field matching module 320 repeats this process with different down-scaling factors to generate various down-scaled search orientation fields. In the example depicted in FIG. 5B, the orientation field matching module 320 repeats the steps 560 and 562a-d over two iterations. However, in other implementations, the orientation matching module 320 may perform such steps over a greater number of iterations based on the geometric attributes search palm print image and/or computational requirements associated with the orientation matching procedure.

In the example, after computing the similarity score 554a, the orientation field match module 320 then selects the top-ranked search orientation blocks (562e). The top-ranked search orientation blocks and their corresponding ranks are then identified in the table 554. The top-ranked search orientation blocks are identified based on the value of the similarity score 554a and the respective values of the similarity scores for each search orientation block that were previously calculated in FIG. 5A.

In some implementations, the similarity score 554a is used to adjust the respective values of the original similarity scores to account for the differences in the original search orientation field and the down-sampled search orientation field. In such implementations, the values of the similarity scores are ranked, and the top-ranked search orientation blocks are selected from the ranked list.

Alternatively, in other implementations, instead of sorting the respective similarity scores associated with the search orientation blocks, the orientation field matching module 320 instead determines which particular search orientation block to include within the list of top-ranked search orientation fields based on comparing the similarity score 554a to a predetermined threshold.

After selecting the top-ranked search orientation fields in step 562e, the orientation field matching module 320 repeats the steps 560-562e in steps 564-566e. However, the difference between these two iterations is that the number of top-ranked search orientation blocks is reduced with each subsequent iteration (e.g., three top-ranked search orientation blocks at the beginning of step 560, and two top-ranked search orientation blocks at the beginning of step 564). In this regard, with the completion of each successive iteration, the orientation field matching module 320 then narrows down the list of top-ranked search orientation fields using different down-scaling factors (e.g., in steps 562b and 566b for the first and second iterations, respectively).

After completing the multiple iterations, the orientation field matching module 320 then selects the highest value similarity score from among the remaining list of top-ranked search orientation blocks as the orientation similarity between the search orientation field and the reference orientation field (568). In the example depicted in FIG. 5B, the similarity score associated with the mated pair including orientation blocks $B'_{S2}$ and $B_{RA}$ identified in list 556 is selected as the orientation similarity score between the search orientation field and the reference orientation field. The orientation field matching module 320 then generates table 558, which identifies the orientation similarity score and the corresponding transformation parameters determined previously in the process 500A.

Minutiae Matching

A. Octant Feature Vector (OFV) Overview

The APIS 100 may compare the search and reference records based on initially generating feature vectors associated with minutiae that are extracted from the search and reference records, respectively. For instance, as described throughout this specification, in some implementations, octant feature vectors (OFVs) may be used to as feature vectors that define attributes of the extracted minutiae. However, in other implementations, other minutiae descriptors may be used.

OFVs encode geometric relationships between reference minutiae and the nearest neighboring minutiae to the reference minutiae in a particular sector (referred to as the "octant neighborhood") of the octant. Each sector of the octant used in an OFV spans 45 degrees of a fingerprint region. The nearest neighboring minutiae may be assigned to one sector of the octant based on their orientation difference. The geometric relationship between a reference minutia and its nearest minutia in each octant sector may be described by relative features including, for example, distance between the minutiae and the orientation difference between minutiae. The representation achieved by the use of an OFV is invariant to transformation. In addition, this representation is insensitive to a nonlinear distortion because the relative features are independent from any transformation.

Pairs of reference minutiae and nearest neighboring minutiae may be identified as "mated minutiae pairs." The mated minutiae pairs in a reference record and a search record may be identified by comparing the respective OFVs of minutiae extracted from the reference record and the search record. The transformation parameters may be estimated by comparing attributes of the corresponding mated minutiae. For example, the transformation parameters may indicate the degree to which the search record has been transformed (e.g., perturbed or twisted) as relative to a particular reference record. In other examples, the transformation parameters may be applied to verify that, for a particular pair of a reference record and a search record (a "potential matched fingerprint pair"), mated minutiae pairs exhibit corresponding degrees of transformation. Based on the amount of corresponding mated minutiae pairs in each potential matched fingerprint pair, and the consistency of the transformation, a similarity score may be assigned. In some implementations, the pair of potential matched fingerprint pairs with the highest similarity score may be determined as a candidate matched fingerprint pair.

The APIS 100 may calculate an OFV for each minutia that encodes the geometric relationships between the reference minutia and its nearest minutiae in each sector of the octant. For instance, the APIS 100 may define eight octant sectors and assigns the nearest minutiae to one sector of the octant based on the location of each minutiae within the sectors. The geometric relationship between a reference minutia and its nearest minutia in each octant sector is represented by the relative features. For example, in some implementations, the OFV encodes the distance, the orientation difference, and the ridge count difference between the reference feature and the nearest neighbor features. Because the minutia orientation can flexibly change up to 45° due to the octant sector approach, relative features are independent from any transformation.

The APIS 100 may use the OFVs to determine the number of possible corresponding minutiae pairs. Specifically, the APIS 100 may evaluate the similarity between two respective OFVs associated with the search record and the file record. The APIS 100 may identify all possible local matching areas of the compared fingerprints by comparing the OFVs. The APIS 100 may also an individual similarity score for each of the mated OFV pairs.

The APIS 100 may clusters all OFVs of the matched areas with similar transformation effects (e.g., rotation and transposition) into an associated similar bin. Note that the precision of the clusters of the bins (e.g., the variance of the similar rotations within each bin) is a proxy for the precision of this phase. Automatic fingerprint identification system 100 therefore uses bins with higher numbers of matched OFVs (e.g., clusters with the highest counts of OFVs) for the first phase global alignment.

The APIS 100 may use the location and angle of each selected bin as the parameters of a reference point (an "anchor point") to perform a global alignment procedure. More specifically, the APIS 100 may identify the global alignment based on the bins that include the greatest number of the global mated minutiae pairs, and the location and angle associated with each of those bins. Based on the number of global paired minutiae found and the total of individual similarity scores calculated for the corresponding OFVs within the bin or bins, the APIS 100 may identify the transformations (e.g., the rotations of the features) with the best alignment.

In a second phase, the APIS 100 performs a more precise pairing using the transformations with the best alignment to obtain a final set of the globally aligned minutiae pairs. In this phase, automatic fingerprint identification system 100 performs a pruning procedure to find geometrically consistent minutiae pairs with tolerance of distortion for each aligned minutiae set that factors in the local and global geometrical index consistency. By performing such alignment globally and locally, automatic fingerprint identification system 100 determines the best set of global aligned minutiae pairs. Automatic fingerprint identification system 100 uses the associated mini-scores of the global aligned pairs to calculate the global similarity score. Furthermore, automatic fingerprint identification system 100 factors in a set of absolute features of the minutiae, including the quality, ridge frequency, and the curvatures in the computation of the final similarity score.

B. Minutiae Matching Techniques

Figure 6:
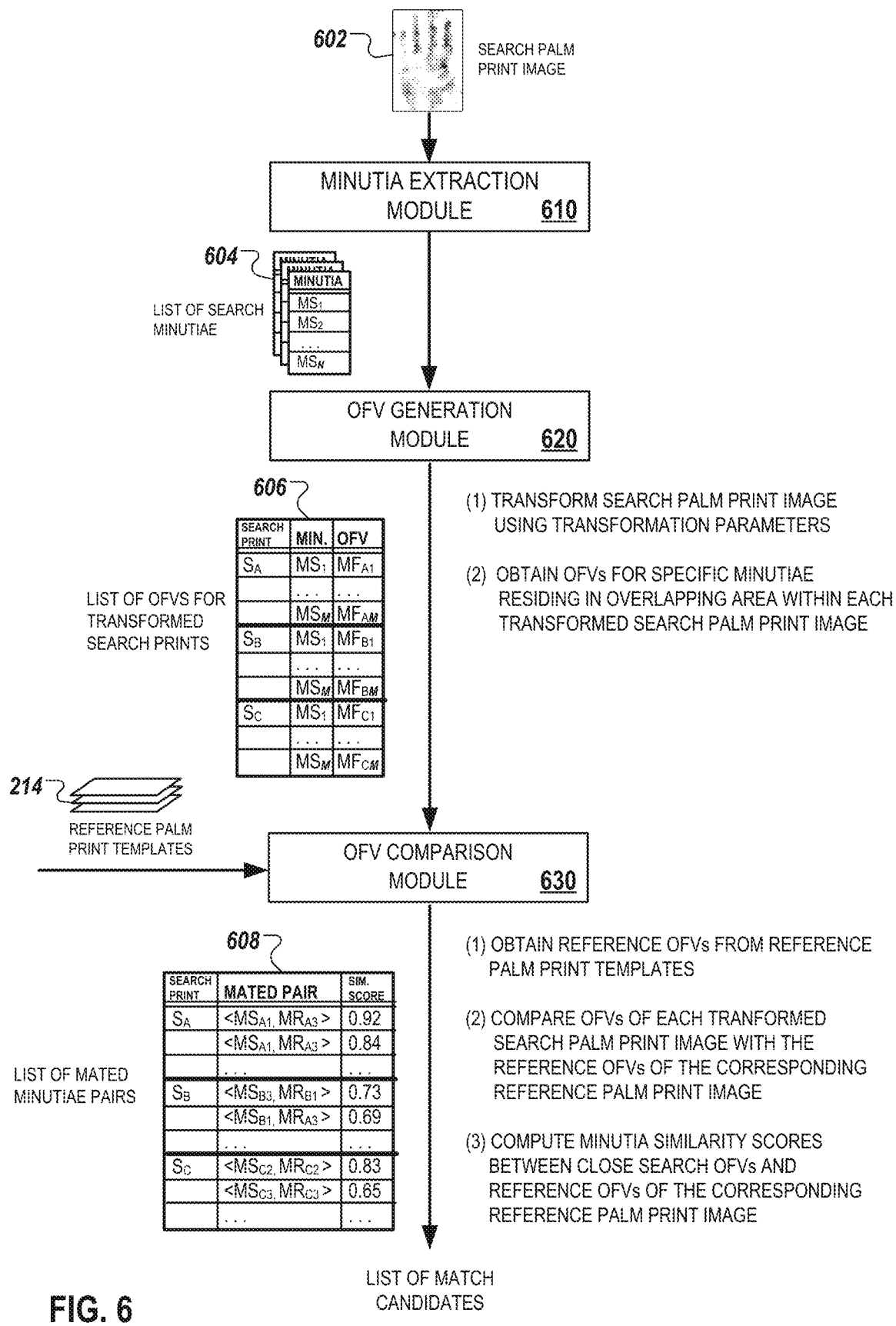
FIG. 6 illustrates an example of a minutiae matching process.

FIG. 6 illustrates an example of a minutiae matching process 600. The process 600 may be performed by the AFIS 100 after performing the orientation field matching processes depicted in FIGS. 4, 5A-5B. In some instances, the process 600 may be performed by the minutia matching module 330.

Initially, a minutia extraction module 610 extracts a list of search minutiae 604 from the search palm print image 602 as described previously. The list of search minutiae 602 only includes minutiae within an overlapping region between a transformed search palm print image and a corresponding reference palm print. In this regard, only locally matched minutiae from the transformed search palm prints are processed to improve the overall speed of the minutiae matching process.

An orientation generation module 620 then obtains transformation parameters for the search palm print image 602 and a corresponding reference palm print image from among the reference palm print images 202 as described previously with respect to FIGS. 3 and 5A. The orientation generation module 620 generates a set of transformed search palm print images for each of the reference palm print images using the transformation parameters.

The orientation generation module 620 then obtains OFV for each specific search minutia included within the list of search minutiae 604 that reside in an overlapping region within each transformed search palm print image. Specifically, as described above, the orientation generation module 620 generates OFVs encoding the distance and the orientation difference between the search minutiae and the nearest neighbor in each of eight octant sectors. The generated OFVs are then included within a list of search OFVs 606.

In the example depicted in FIG. 6, the OFV generation module 620 generates OFVs for minutiae extracted from three transformed search palm print images (e.g., $S_A$, $S_B$, and $S_C$). Each transformed search palm print image includes a set of minutiae, which the OFV generation module 620 generates OFVs for (e.g., $MF_{A1}$-$MF_{AM}$ for $S_A$, $MF_{B1}$-$MF_{BM}$ for $S_B$, and $MF_{C1}$-$MF_{CM}$ for $S_C$). The list of search OFVs 606 are then provided to an OFV comparison module 630.

The OFV comparison module 630 then compares the search OFVs for each transformed search palm print image to reference OFVs of the corresponding reference palm print image. For instance, the OFV comparison module 630 obtains the reference palm print templates 214 from storage and then selects the reference OFVs included within the reference palm print templates 214.

In comparing the search OFVs of each transformed search palm print image and the reference OFVs of the corresponding reference palm print image associated with a particular reference template, the OFV on module 630 performs a coarse comparison to determine if the two OFVs have a similarity above a predetermined threshold. For instance, the similarity of the search and reference OFVs can be determined based on the orientation difference and distance between the two minutiae associated with the OFVs. If the coarse comparison indicates that the OFVs have a similarity above the predetermined threshold, then the OFV comparison module 630 then computes a minutia similarity score that reflects a more precise similarity between a search minutia and a corresponding reference minutia. In this regard, the coarse comparison can be used to disregard two OFVs that are unlikely to include mated minutiae pairs such that the OFV comparison module 630 performs precise minutiae matching only for OFV pairs that are likely to have mated minutiae. This technique effectively reduces the speed associated with minutiae matching by reducing the number of matching procedures to be performed.

After comparing the search OFVs to the reference OFVs for each transformed search palm print image, the OFV comparison module 630 then generates a list of mated minutiae pairs 608 that specifies a minutia similarity score between a search minutia from the transformed search palm print image and its corresponding reference palm print image. The values of the similarity scores are then sorted in descending order to identify a list of possible mated minutiae pairs for each transformed search palm print image.

The identified mated minutiae pairs within the list 608 can then be used to globally align the transformed search palm print image and its corresponding reference palm print image and calculate an overall similarity score between the transformed search palm print image and the corresponding reference palm print image. For example, in some instances, the rotation angle between the search palm print image and the reference palm print image determined in the orientation field matching stage can be used to select a subset of the mated minutiae pairs, which are then used for minutiae pairing and global alignment of the transformed search palm print image and the reference palm print image. In this example, the minutiae similarity score with the highest value can be selected as the overall similarity score between the transformed search palm print image and the corresponding reference palm print image.

The respective overall similarity scores between each transformed search palm print image and its corresponding reference palm print image are then aggregated and sorted in a list. The values of respective overall similarity scores are used to identify the reference palm prints that are most likely to represent match candidates for the input search palm print image. For example, the AFIS 110 may use a predetermined threshold for the overall similarity score and determine that the reference palm print images with an overall similarity score above the predetermined threshold are match candidates for the input search palm print image. The match results can then be provided for output.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, ROM, EEPROM, random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

A technical effect of systems and methods described herein includes at least one of: (a) increased accuracy in facial matching systems; (b) reduction of false accept rate (FAR) in facial matching; (c) increased speed of facial matching.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In some implementations, a computer program is provided, and the program is embodied on a computer readable medium. In an example implementation, the system is executed on a single computer system, without requiring a connection to a sever computer. In a further implementation, the system is being run in a Windows® environment (Windows is a registered trademark of Microsoft Corporation, Redmond, Wash.). In yet another implementation, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some implementations, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example implementation" or "some implementations" of the present disclosure are not intended to be interpreted as excluding the existence of additional implementations that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, ROM, EEPROM, random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

A technical effect of systems and methods described herein includes at least one of: (a) increased accuracy in facial matching systems; (b) reduction of false accept rate (FAR) in facial matching; (c) increased speed of facial matching.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method performed by one or more computers, the method comprising:
   obtaining, by the one or more computers, data identifying a first set of one or more regions of a search palm print image that include one or more distinctive search orientation blocks within a search orientation field generated for the search palm print image, each distinctive search orientation block having an orientation difference, relative to an adjacent search orientation block within the search orientation field, that satisfies a predetermined threshold;
   obtaining, by the one or more computers, data identifying a second set of one or more regions of a reference palm print image that include one or more distinctive reference orientation blocks within a reference orientation field generated for a reference palm print image, each distinctive reference orientation block having an orientation difference, relative to an adjacent reference orientation block within the reference orientation field, that satisfies the predetermined threshold;
   computing, by the one or more computers, a similarity score between the search palm print image and the reference palm print image based on a subset of top-ranked distinctive search orientation blocks, wherein computing the similarity score comprises:
      generating a down-sampled search orientation field that has a particular resolution lower than the original resolution of the search orientation field,
      computing a respective similarity score for each of the one or more regions of the down-sampled search orientation field and a corresponding mated region of the reference orientation field, and
      selecting the subset of top-ranked distinctive search orientation blocks based on the similarity scores of the one or more regions of the down-sampled search orientation field; and
   providing, by the one or more computers, the similarity score for output.

2. The method of claim 1, wherein:
   each distinctive search orientation blocks indicates a respective ridge flow direction in a spatial location within the search orientation field corresponding to each distinctive search orientation block; and
   each distinctive reference orientation blocks indicates a respective ridge flow direction in a spatial location within the reference orientation field corresponding to each distinctive reference orientation block.

3. The method of claim 1, wherein the selected subset of top-ranked distinctive search orientation blocks of each successive iterative comparison includes a smaller number of distinctive search orientation blocks compared to the selected subset of top-ranked distinctive search orientation blocks of the preceding iterative comparison.

4. The method of claim 1, wherein the down-sampled search orientation field generated at each successive iterative comparison has a lower resolution compared to the resolution of the down-sampled search orientation field generated at a preceding comparison.

5. The method of claim 1, wherein the down-sampled search orientation field is generated during an enrollment stage of the search palm print image.

6. The method of claim 1, wherein:
   the obtained reference template identifies (i) a plurality of reference minutiae, and (ii) for each reference minutia, a corresponding reference octant feature vector; and
   the method further comprises:
      determining one or more transformation parameters between the search orientation field and the reference orientation field based at least on comparing one or more regions of the search orientation field and the one or more corresponding regions of the reference orientation field;
      aligning, using the one or more transformation parameters, the search palm print image to a coordinate system associated with the reference palm print image, the aligned search palm print image including an overlapping region between the aligned palm print image and the reference palm print image;
      identifying a plurality of search minutiae within the overlapping region of the aligned search palm print image;
      generating a search octant feature vector for each minutia within the identified plurality of search minutiae;
      identifying, for each generated search octant feature vector, a mated reference octant feature vector from among the plurality of reference octant feature vectors;
      comparing one or more features indicated by each search octant feature vector and one or more corresponding features indicated by each mated reference octant feature vector; and
      computing a match similarity score between the search palm print and the reference palm print based at least on comparing one or more features indicated by each search octant feature vector and one or more corresponding features indicated by each mated reference octant feature vector.

7. A system comprising:
   one or more computers; and
   one or more storage devices storing instructions that, when executed by the one or more computers, cause the one or more computers to perform operations comprising:
      obtaining, by the one or more computers, data identifying a first set of one or more regions of a search palm print image that include one or more distinctive search orientation blocks within a search orientation field generated for the search palm print image, each distinctive search orientation block having an orientation difference, relative to an adjacent search orientation block within the search orientation field, that satisfies a predetermined threshold;

obtaining, by the one or more computers, data identifying a second set of one or more regions of a reference palm print image that include one or more distinctive reference orientation blocks within a reference orientation field generated for a reference palm print image, each distinctive reference orientation block having an orientation difference, relative to an adjacent reference orientation block within the reference orientation field, that satisfies the predetermined threshold;

computing, by the one or more computers, a similarity score between the search palm print image and the reference palm print image based on a subset of top-ranked distinctive search orientation blocks, wherein computing the similarity score comprises:
  generating a down-sampled search orientation field that has a particular resolution lower than the original resolution of the search orientation field,
  computing a respective similarity score for each of the one or more regions of the down-sampled search orientation field and a corresponding mated region of the reference orientation field, and
  selecting the subset of top-ranked distinctive search orientation blocks based on the similarity scores of the one or more regions of the down-sampled search orientation field; and providing, by the one or more computers, the similarity score for output.

8. The system of claim 7, wherein:
each distinctive search orientation blocks indicates a respective ridge flow direction in a spatial location within the search orientation field corresponding to each distinctive search orientation block; and
each distinctive reference orientation blocks indicates a respective ridge flow direction in a spatial location within the reference orientation field corresponding to each distinctive reference orientation block.

9. The system of claim 7, wherein the selected subset of top-ranked distinctive search orientation blocks of each successive iterative comparison includes a smaller number of distinctive search orientation blocks compared to the selected subset of top-ranked distinctive search orientation blocks of the preceding iterative comparison.

10. The system of claim 7, wherein the down-sampled search orientation field generated at each successive iterative comparison has a lower resolution compared to the resolution of the down-sampled search orientation field generated at a preceding comparison.

11. The system of claim 7, wherein the down-sampled search orientation field is generated during an enrollment stage of the search palm print image.

12. The system of claim 7, wherein:
the obtained reference template identifies (i) a plurality of reference minutiae, and (ii) for each reference minutia, a corresponding reference octant feature vector; and
the operations further comprise:
  determining one or more transformation parameters between the search orientation field and the reference orientation field based at least on comparing one or more regions of the search orientation field and the one or more corresponding regions of the reference orientation field;
  aligning, using the one or more transformation parameters, the search palm print image to a coordinate system associated with the reference palm print image, the aligned search palm print image including an overlapping region between the aligned palm print image and the reference palm print image;
  identifying a plurality of search minutiae within the overlapping region of the aligned search palm print image;
  generating a search octant feature vector for each minutia within the identified plurality of search minutiae;
  identifying, for each generated search octant feature vector, a mated reference octant feature vector from among the plurality of reference octant feature vectors;
  comparing one or more features indicated by each search octant feature vector and one or more corresponding features indicated by each mated reference octant feature vector; and
  computing a match similarity score between the search palm print and the reference palm print based at least on comparing one or more features indicated by each search octant feature vector and one or more corresponding features indicated by each mated reference octant feature vector.

13. A non-transitory computer-readable storage device encoded with computer program instructions that, when executed by one or more computers, cause the one or more computers to perform operations comprising:
obtaining, by the one or more computers, data identifying a first set of one or more regions of a search palm print image that include one or more distinctive search orientation blocks within a search orientation field generated for the search palm print image, each distinctive search orientation block having an orientation difference, relative to an adjacent search orientation block within the search orientation field, that satisfies a predetermined threshold;
obtaining, by the one or more computers, data identifying a second set of one or more regions of a reference palm print image that include one or more distinctive reference orientation blocks within a reference orientation field generated for a reference palm print image, each distinctive reference orientation block having an orientation difference, relative to an adjacent reference orientation block within the reference orientation field, that satisfies the predetermined threshold;
computing, by the one or more computers, a similarity score between the search palm print image and the reference palm print image based on a subset of top-ranked distinctive search orientation blocks, wherein computing the similarity score comprises:
  generating a down-sampled search orientation field that has a particular resolution lower than the original resolution of the search orientation field,
  computing a respective similarity score for each of the one or more regions of the down-sampled search orientation field and a corresponding mated region of the reference orientation field, and
  selecting the subset of top-ranked distinctive search orientation blocks based on the similarity scores of the one or more regions of the down-sampled search orientation field; and
providing, by the one or more computers, the similarity score for output.

14. The device of claim 13, wherein:
each distinctive search orientation blocks indicates a respective ridge flow direction in a spatial location within the search orientation field corresponding to each distinctive search orientation block; and each distinctive reference orientation blocks indicates a respective ridge flow direction in a spatial location within the reference orientation field corresponding to each distinctive reference orientation block.

15. The device of claim 13, wherein the selected subset of top-ranked distinctive search orientation blocks of each successive iterative comparison includes a smaller number of distinctive search orientation blocks compared to the selected subset of top-ranked distinctive search orientation blocks of the preceding iterative comparison.

16. The device of claim 13, wherein the down-sampled search orientation field generated at each successive iterative comparison has a lower resolution compared to the resolution of the down-sampled search orientation field generated at a preceding comparison.

17. The device of claim 13, wherein the down-sampled search orientation field is generated during an enrollment stage of the search palm print image.

* * * * *